June 14, 1938.                P. P. NAZIR                2,120,568
                         AEROPLANE AND THE LIKE
                          Filed April 11, 1936
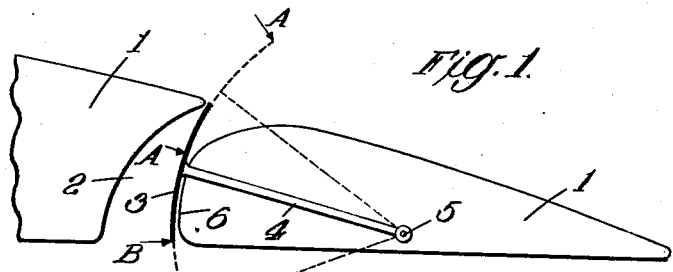
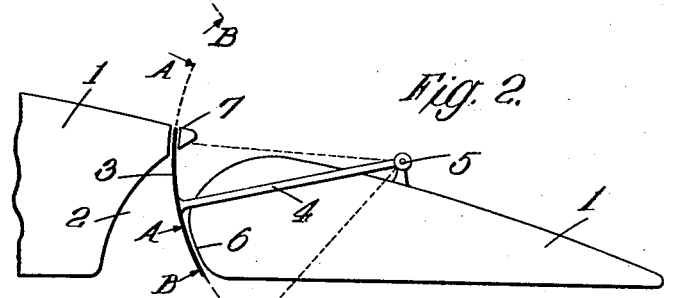
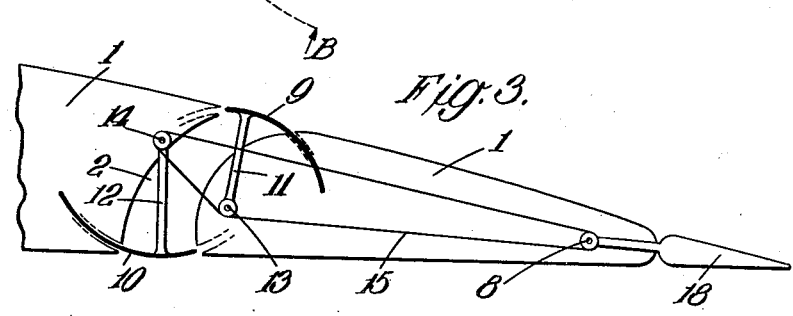
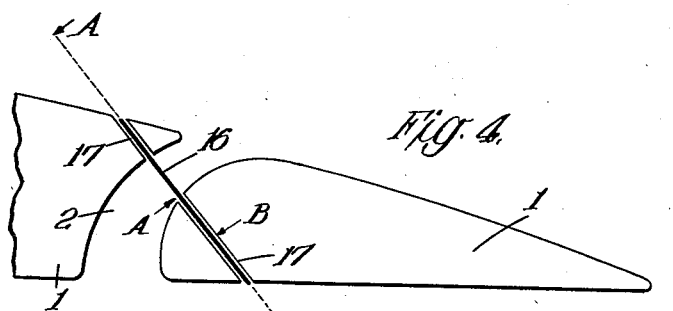
PHIROZE PESTONJI NAZIR
       INVENTOR
By— *[signature]*
            his ATT'Y.

Patented June 14, 1938

2,120,568

UNITED STATES PATENT OFFICE 2,120,568

AEROPLANE AND THE LIKE

Phiroze Pestonji Nazir, Byfleet, England

Application April 11, 1936, Serial No. 73,820
In Great Britain April 18, 1935

5 Claims. (Cl. 244—42)

This invention relates to aeroplanes or like flying machines having fixed supporting wings, and has for its principal objects to improve the stability, controllability and speed range thereof.

Further objects of the invention are to provide improved lateral control, especially at and near the stalling point, to reduce take-off and landing distances, and to render possible taking off and landing at low speeds with high lift.

With the above objects in view, the invention contemplates the provision of an air passage passing through a fixed supporting wing or aerofoil, preferably towards the trailing edge thereof, and adapted to place the upper and lower surfaces thereof in communication with one another, and a movable plate or the like associated with the said air passage and adapted to modify the air flow past or through the wing.

Preferably the air passage is in the form of a slot running in the direction of the span of the wing and inclined or curved backwardly and upwardly in cross sections in the plane of the chord thereof.

Preferably also the plate or the like is normally housed wholly within the wing and closes the slot, but is adapted to be lowered to a position where it projects rearwardly and downwardly beneath the wing to give auxiliary lift, its movement to the said position opening the slot.

The plate or the like may also be adapted to be raised to a position where it projects upwardly above the wing to increase the drag thereof.

The invention may obviously take a large variety of practical forms, and the accompanying drawing illustrates, by way of example only, several of these.

Fig. 1 is a diagrammatic sectional view of one embodiment;

Fig. 2 is a diagrammatic sectional view of another embodiment showing an elevated position of the axis;

Fig. 3 is a similar view showing two pivoted plates; and

Fig. 4 is a further diagrammatic sectional view of a modification showing a flat rectangular plate.

Each of the four figures of the drawing is a purely diagrammatic section of the relevant part of a wing 1 in the plane of the chord thereof, the air passage or slot 2 being upwardly and rearwardly curved as above mentioned and extending for an appropriate distance in the direction of the wing span.

In the construction shown in Figure 1, the slot 2 is normally closed by a plate 3 of the appropriate rectangular outline housed wholly within the wing section with its upper and lower edges respectively closely adjacent to the front upper and rear lower margins of the slot 2, so that it seals the latter against the passage of air therethrough.

The plate 3 is curved into part cylindrical shape about a horizontal axis 5 lying within the wing to the rear of the slot 2, and is pivoted about this axis by arms 4.

Thus if the plate is pivoted downwardly into the position B—B it projects downwardly and rearwardly from the lower surface of the wing to increase the lift thereof at low speeds, e. g. when landing, and at the same time the slot 2 is opened to allow air to pass through the wing and enhance the effect in question by checking the development of turbulence in the upper boundary layer.

If, conversely, the plate 3 is upwardly pivoted into the position A—A it projects from the upper surface of the wing and substantially increases the drag thereof when required. In this case, however, it will be noted that since the lower part 6 of the rear wall of the slot 2 is shaped to correspond to the curvature of the plate 3, the upward movement of the latter will not cause the slot to open.

If desired, a rectangular horizontal forward extension or flange (not shown) may be provided on the lower edge of the plate, this serving to close the lower aperture of the slot and maintain the lower surface of the wing substantially unbroken during normal flight.

It will be appreciated that the respective attitudes of the exposed portions of the plate when projecting above or below the wing will be largely determined by the location of the axis 5 in conjunction with the wing thickness at the slot 2. In constructions such as that under discussion an elevated position of the axis 5 is advantageous, as will be clear from Figure 2.

In this figure, the axis in question is shown in an extreme position, namely above the upper wing surface, although in practice it might be preferable for aerodynamic reasons to position it just within the wing. It will be observed that in this case, movement of the plate 3 to the position A—A causes it to project approximately normally from the upper wing surface to give the maximum drag, whereas in the position B—B it projects downwardly and rearwardly at a general angle appropriate to its lifting function at this time. The modified position of the axis may necessitate intersection of the upper front wall of the slot 2 by the upper part of the plate 3, in which case a narrow slot 7 may be provided for giving passage to the latter.

The construction illustrated in Figure 3 differs from the foregoing forms in that two pivoted plates 9 and 10 are adapted simultaneously to open and close the upper and lower apertures of the slot 2, being moved in appropriate conjunction with a pivoted trailing edge flap or aileron 18.

These plates 9 and 10 are rectangular in outline and are cylindrically curved about axes 11 and 12 respectively, about which also they are pivoted by arms 13, 14. These plates maintain both wing surfaces substantially unbroken during normal flight.

The trailing edge flap 18 is pivotally mounted at 8, and the means for co-ordinating the movements of the three movable members is here represented by a cable 15 passing around the axes 8, 13 and 14. Consideration of the disposition of the various parts in Figure 3 will show that when the flap 18 is depressed the plates 9 and 10 pivot aside to open the slot 2, whereas when 18 is raised the plates pivot in the reverse senses, but without in this case uncovering the apertures of the slot.

In the arrangement of Figure 4 a flat rectangular plate 16 is provided which normally lies entirely within a narrow forwardly-inclined guide slot 17 intersecting the air slot 2 along a general line within the wing and parallel to the span. The plate 16 may be slid to project downwardly and rearwardly from the under surface of the wing in the position B—B, or upwardly and forwardly from the upper surface thereof in the position A—A. It will be noted that the general line of intersection of the plate 16 and slot 2 is situated towards the upper edge of the plate, so that downward movement of the plate opens the slot whereas upward projection thereof does not.

It will of course be understood that the particular constructions described and illustrated are given as examples only, and may be widely varied without departing from the invention.

For example, a plate may be positioned externally adjacent either or each opening of the slot and adapted normally to nest against the wing surface, being movable bodily away therefrom or being pivotally mounted so as to be swung when desired into a projecting position.

In such constructions the slot may be closed by an auxiliary shutter coupled to or operated simultaneously with the plate to open the slot.

In all cases, by suitably perforating or aperturing the plate, the opening of the air slot may be made gradual, and in fact the effective opening of the slot may have any chosen value for each position of the plate.

A further point to be noted is that although arrangements according to the invention provided on opposite wings of an aircraft are primarily intended to be manipulated together, e. g. the plates or flaps to be lowered simultaneously for facilitating landing of the aircraft, provision may be made for differentially varying the drag and/or lift of opposite wings by means thereof, whereby the usual ailerons for lateral control may be in suitable cases dispensed with.

It should also be pointed out that although in the particular examples described the plate, when projecting above the wing, is situated forwardly of the upper aperture of the slot, it may if desired be situated rearwardly thereof. In such cases it may be advantageous for the slot to be open when the plate projects upwardly, since the air issuing therefrom will impinge upon the front of the plate and increase the drag effect thereof, and the invention extends to such arrangements.

It will also be apparent that arrangements according to the invention may be employed in the tailplanes of aircraft in order to effect the longitudinal control or adjust the longitudinal stability thereof.

I claim:—

1. In an aircraft the combination, with a fixed supporting wing of invariable cross-sectional shape and camber and having a normally closed slot formed through the rear part thereof and inclined or curved upwardly and backwardly, of an auxiliary plate carried by the wing and movable to project downwardly and rearwardly therefrom to give auxiliary lift and simultaneously to open said slot, said plate also being movable to project above said wing and increase the drag thereof.

2. In an aircraft, the combination according to claim 1, comprising further means to pivotally carry said plate behind the trailing edge of said wing and a shutter system operatively connected to said plate for opening and closing said slot.

3. In an aircraft the combination with a fixed supporting wing of invariable cross-sectional shape and camber and having a slot formed through the rear part thereof, of an auxiliary flat rectangular plate housed slidingly in a forwardly inclined guide passage intersecting said slot and positioned normally wholly within said wing to close said slot, said plate being movable to project downwardly and rearwardly from said wing to give auxiliary lift and simultaneously to open said slot, and also movable to project above said wing and increase the drag thereof.

4. In an aircraft the combination according to claim 1 and wherein the said auxiliary plate is normally housed wholly within said wing and intersecting said slot to close it, and is both curved and pivoted about an axis lying to the rear of said slot.

5. In an aircraft the combination according to claim 1 and wherein the said auxiliary plate is normally housed wholly within said wing and intersecting said slot to close it, and is both curved and pivoted about an axis lying to the rear of said slot and closely adjacent to the upper surface of said wing.

PHIROZE PESTONJI NAZIR.